United States Patent

[11] 3,625,930

[72] Inventors Alex S. Toback
West Hartford, Conn.;
William E. Cass, Wayland, Mass.
[21] Appl. No. 694,053
[22] Filed Dec. 28, 1967
[45] Patented Dec. 7, 1971
[73] Assignee Loctite Corporation
Newington, Conn.

[54] ANAEROBIC COMPOSITION AND PROCESS FOR BONDING NONPOROUS SURFACES, SAID COMPOSITION COMPRISING AN ACRYLIC MONOMER A PEROXY INITIATOR AND A BONDING ACCELERATOR
13 Claims, No Drawings

[52] U.S. Cl. .................................................. 260/89.5,
117/128.4, 161/216, 260/31.6, 260/47, 260/86.1,
260/86.7
[51] Int. Cl. ...................................................... C08f 3/64,
C08f 3/66, C08f 15/18
[50] Field of Search ............................................. 260/89.5,
85.5 N, 86.1, 86.1 E

[56] References Cited
UNITED STATES PATENTS

| 3,046,262 | 7/1962 | Krieble | 260/89.5 |
| 3,180,777 | 4/1965 | Karo | 260/89.5 |
| 3,207,815 | 9/1965 | Joo et al. | 260/85.5 N |
| 3,218,305 | 11/1965 | Krieble | 260/89.5 |
| 3,317,491 | 5/1967 | Kanavel | 260/86.1 |
| 3,338,876 | 8/1967 | Kanavel et al. | 260/86.1 |
| 3,370,051 | 2/1968 | Sullivan et al. | 260/86.1 |

Primary Examiner—Harry Wong, Jr.
Attorneys—J. Rodney Reck and Watson, Cole, Grindle and Watson ABSTRACT: The speed of cure of a peroxy initiated acrylate based adhesive composition is markedly increased by pretreating one or more of the surfaces to be bonded with, as an organic bonding accelerator, a compound containing either a

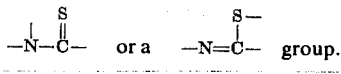

group.

3,625,930

ANAEROBIC COMPOSITION AND PROCESS FOR BONDING NONPOROUS SURFACES, SAID COMPOSITION COMPRISING AN ACRYLIC MONOMER A PEROXY INITIATOR AND A BONDING ACCELERATOR

BACKGROUND OF THE INVENTION

It is well recognized that the adhesive bonding of surfaces has a number of inherent advantages over the more traditional mechanical methods of joining, such as by clamps, nuts and bolts, etc. One of the most important reasons adhesives have not made more sizable inroads into industrial bonding applications is their lack of speed in curing. This is particularly true in manufacturing operations where it is not convenient to apply adhesives to parts and store them for long periods of time to allow the adhesives to cure in the conventional manner, especially when alignment is important and the parts must be maintained in a specific position or configuration until adequate curing of the adhesive has taken place.

One type of adhesive which, if the speed of cure were increased, could be adapted more readily to the solution of a wide variety of industrial problems is the polymerizable acrylate based adhesives of the anaerobic type (active in the absence of oxygen). The polymerization (cure) of these adhesives, as is more fully discussed below, can be initiated by certain free radical generators, most commonly a peroxy type polymerization initiator. Many types of desirable anaerobic adhesives can be prepared because of the wide variety of viscosity and speed of cure characteristics available in the acrylate monomers, and flexibility, tensile strength and heat resistance characteristics available in the cured products.

In the prior art there are known a number of polymerization accelerators which can be used to increase the rate of polymerization of unsaturated monomers. However, a fully acceptable bonding accelerator has not been available for acrylate based adhesive compositions, particularly one which could provide adequate acceleration when applied as a "-primer" or "surface activator" to one of the surfaces to be bonded (vis-a-vis mixed with the adhesive at the time of use in the conventional two-part adhesive fashion). The reasons are not fully clear; but in addition to lack of the native accelerating ability, most polymerization accelerators are not suitable bonding accelerators because they have either an adverse effect on the strength of the adhesive bonds which are formed, or because they are incompatible with the adhesive formulation. The compatibility consideration is particularly important when dealing with primers since little or no mixing is available under these conditions of use. Certainly there are other factors involved but, because of the complexity of the reactants and reaction mechanisms, they are not clearly understood at this time.

An adhesive system capable of rapid bonding of parts would be a major improvement in the area of adhesive bonding. Further, a bonding accelerator which is capable of markedly increasing the activity of surfaces for adhesive bonding, or of markedly increasing the rate of bonding of an acrylate based adhesive would be a novel and useful product.

THE INVENTION

This invention deals with a surface primer containing an organic compound having either a

or

group. It involves, further, adhesive compositions comprising: a) a polymerizable acrylate ester monomer; b) a free radical generating polymerization initiator, such as a peroxy type polymerization initiator; and c) an organic bonding accelerator containing an organic compound having a group selected from the class consisting of

and

It also relates to a multipart adhesive system which comprises: a) as a polymerizable adhesive composition, a mixture of a polymerizable acrylate ester monomer and a peroxy polymerization initiator; and b) as a bonding accelerator, an organic compound containing either a

or a

group.

In use, the adhesive system provides a process for the extremely rapid bonding of surfaces by applying each of the two components to at least one of a plurality of surfaces to be bonded, and then placing the surfaces so treated in abutting relation until the adhesive system polymerizes and bonds the surfaces together.

DISCUSSION OF THE INVENTION AND ITS PREFERRED EMBODIMENTS

The bonding accelerators for use in the invention disclosed herein have been found adaptable to increasing the activity of surfaces for adhesive bonding, and particularly for increasing the speed of cure of anaerobic adhesive systems, as more fully discussed below. Other classes of related chemical compounds have not been found to produce comparable results.

It is apparent that the two classes of organic bonding accelerators of the invention disclosed herein have a tautomeric relationship, which may explain the relation in their properties for purposes of this invention. It should be noted however that, as a class, the compounds containing the

group show superior accelerating properties over their

counterparts.

THe existence of the tautomeric relationship easily can be seen from the electron configurations of the two groups, i.e., $$:\ddot{N}:\ddot{C}::\ddot{S}$$

and, $$:N::\ddot{C}:\ddot{S}:$$

The electron pairs on the nitrogen and carbon atoms are bonded, and two of the electron pairs on the sulfur atom are unbonded. Compounds according to this definition can be represented as follows:

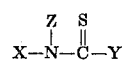

and

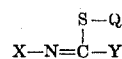

The NCS arrangement appears to be the critical factor and the nature of the X, Y, Z, and Q substituents does not appear to be critical to the broad concept of this invention. For example, either or both of X and Z can be —H or —R, where —R is an alkyl, cycloalkyl, aryl, aralkyl or other hydrocarbon radical containing up to about 10 carbon atoms. Similarly, Y can be —H, —R, —SX, —NXZ or —N=R, R, X and Z being as defined above. Similarly, Q can be —H, —R, —SX or another

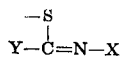

group, all as defined above.

It is understood that the hydrocarbon groups, as defined above, can contain certain substituents, such as hydroxy, halo, thio or amino substituents, and certain linkages, such as ether, thio and imino linkages, provided such substituents and/or linkages do not affect adversely the accelerating properties of the bonding accelerator for the purposes disclosed herein.

Frequently the X and Y substituents are united to form a heterocyclic ring which includes the nitrogen and carbon atoms of the

or

groups, i.e.,

and $$\begin{array}{c} S-Q \\ | \\ N=C \\ | \ | \\ X-Y \end{array}$$

(As used herein, "heterocyclic ring" includes a polynuclear hetrocyclic ring system, such as those mentioned hereinafter). For example, this heterocyclic ring may take the form of a pyrrole, pyrazole, isoazole, oxazole, isoxazine, oxazine or, most preferably, thiazole heterocyclic ring, or of a polynuclear heterocyclic ring system, such as an indole, isobenzazole, isoquinoline, acridine or, most preferably, benzothiazole polynuclear ring system. Compounds wherein in the X and Y substituents are united in a heterocyclic ring structure are preferred embodiments of this invention. These compounds have been found to have particularly acute accelerating properties when used with the anaerobic adhesives disclosed below.

Typical examples of compounds which fall within the above description of bonding accelerators for use in the invention disclosed herein are the following: thioacetamide, tetramethylthiuram disulfide, thiocarbanilide, copper dimethyldithiocarbamate, thiourea, N,N'-dicyclohexyl thiourea and 1-alyl-2-thiourea. Typical examples of bonding accelerators wherein the X and Y are joined to form a heterocyclic ring, as defined above, are s-triazole-3-thiol, 2-mercapto thiazoline, mercaptobenzothiazole, N-cyclohexyl-benzothiazole-2-sulfonamide, N-oxydiethylenebenzothiazole-2-sulfonamide, and 5-amino-2-benzimidazolethiol.

In order to obtain the maximum benefits of the bonding systems disclosed herein, it is important that the anaerobic adhesive be intimately contacted with the bonding accelerator. While this can be accomplished in a number of ways, it has been found preferable to dissolve or disperse the bonding accelerator in a volatile solvent. The solution or dispersion of bonding accelerator in the solvent then can be applied to at least one of the surfaces to be bonded, and the solvent allowed to evaporate leaving a deposit of bonding accelerator on the surface or surfaces. The adhesive then can be applied directly to at least one of the surfaces to be bonded. It is not material whether the adhesive and the bonding accelerator are applied to the same or different surfaces. The surfaces so treated then are placed or clamped together and the adhesive allowed to cure.

In choosing the solvent for dissolution or dispersion of the bonding accelerator, a solvent with a rapid rate of evaporation is desirable. This reduces the possibility of trapping solvent in the bonding accelerator-adhesive system during the bonding operation, which may tend to weaken the bond, and also avoids unnecessary delays to allow the solvent to evaporate before completing the bonding operation. While a large number of solvents are available for this purpose, the ones which have been found most useful are halogenated hydrocarbons, particularly chlorinated and/or fluorinated hydrocarbons, such as methylene chloride, trichloroethylene, methylchloroform and trichloromonofluoromethane, and lacquer type solvents, such as acetone, methyl ethyl ketone, methyl isobutyl ketone, and ethyl acetate. Other acceptable solvents are xylene, benzene and toluene. Nearly all of these solvents, and particularly the halogenated hydrocarbons, produce a secondary benefit in that they can serve to clean the area of the surface which is to be bonded, thus reducing the chances of weak bond formation.

Frequently a small amount of a second, or "mutual," solvent can be added to the system in order to aid in solubilizing or dispersing the bonding accelerator. (Certain of the bonding accelerators disclosed herein are not excessively soluble in a number of the "primary" solvents disclosed above). Since nearly all of the bonding accelerators disclosed herein are soluble in alcoholic type solvents, such as ethyl alcohol, methyl alcohol, butyl alcohol, and isopropyl alcohol. These have been found particularly adaptable to use as mutual solvents. Since many of these mutual solvents do not vaporize with the rapidity of the primary solvents, they should be used in as small an amount as possible, consistent with dissolving or dispersing the bonding accelerator. Preferably, the amount of mutual solvent should not exceed 15 percent by weight of the total amount of solvent in the system.

The most highly preferred method of applying the bonding accelerator to the surface is from an aerosol container. In this manner a thin uniform film of the bonding accelerator is easily applied to the surface, and the maximum rate of solvent vaporization is achieved. Furthermore, more highly volatile solvents can be used under aerosol conditions than can be used conveniently in standard atmospheric pressure containers. Typical solvents within this category are dichlorodifluoromethane, vinyl chloride, and monochlorodifluoromethane. Upon release from the aerosol container, these solvents will evaporate exceedingly rapidly and thus shorten the time period between application of the bonding accelerator and completion of the bonding operation.

The amount of bonding accelerator to be applied to a given surface is not critical, but should be no more than necessary to obtain efficient acceleration of the bonding operation. Excess accelerator on one or more of the bonded surfaces can affect adversely the strength of the final bond. Further, when the amount of bonding accelerator exceeds about 5 percent by weight of the adhesive used, little if any additional increase in speed is noted. Generally, an amount of bonding accelerator equal to from about 0.1 percent about 1.0 percent by weight of the adhesive is adequate. While it is not easy to determine the amount of accelerator applied to a given surface, adequate results are obtained with the single application by aerosol or otherwise of a thin film of the accelerator dissolved or dispersed in an appropriate solvent to one of the surfaces to be bonded.

When the bonding accelerator has been applied to the surface and the solvent, if any, has been allowed to evaporate, the bonding operation can proceed in the normal manner. The adhesive can be applied either to the surface which has been treated with the bonding accelerator or to the appropriate mating surface. Customarily, as with most bonding operations, a thin film of adhesive is most desirable. The two mating surfaces are then placed in abutting relationship, and, preferably, a moderate compressive force is applied, in order to produce a relatively thin layer of adhesive between the two surfaces, spread the adhesive evenly between the surfaces, and thus maximize the bonding efficiency. Typically a thickness of adhesive between the surfaces of from about 0.001 inch to about 0.005 inch is desirable; such thickness generally can be achieved with the adhesives disclosed herein by the application of a compressive force of from about 5 to about 50 pounds per square inch.

The adhesives contemplated for use in the invention disclosed herein are anaerobic adhesives of the acrylate ester type. Anaerobic adhesives are those which remain stable in the presence of air or oxygen, but which when removed from the presence of air or oxygen will polymerize to form hard, durable resins. This type of adhesive is particularly adaptable to the bonding of metals and other nonporous or nonair permeable materials since they effectively exclude air and oxygen from contact with the adhesive, and therefore the adhesive polymerizes and bonds the surfaces together. Of particular utility as adhesive materials are polymerizable di- and other poly- acrylate esters since, because of their ability to form cross-linked polymers, they have more highly desirable adhesive properties. However, monoacrylate esters can be used, particularly if the nonacrylate portion of the ester contains a hydroxyl or amino group, or other reactive substituent which serves as a site for potential cross-linking. Examples of monomers of this type are hydroxyethyl methacrylate, cyanoethyl acrylate, t-buytlaminoethyl methacrylate and glycidal methacrylate. Anaerobic properties are imparted to the acrylate ester monomers by combining with them a peroxy polymerization initiator as discussed more fully below.

One of the most preferable groups of polyacrylate esters which can be used in the adhesives disclosed herein are polyacrylate esters which have the following general formula:

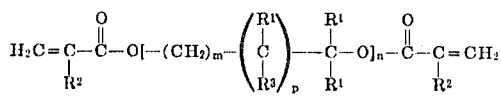

wherein $R^1$ represents a radical selected from the group consisting of hydrogen, lower alkyl of from one to about four carbon atoms, hydroxy alkyl of from one to about four carbon atoms, and

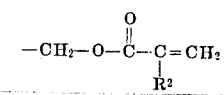

$R^2$ is a radical selected from the group consisting of hydrogen, halogen, and lower alkyl of from one to about four carbon atoms; $R^3$ is a radical selected from the group consisting of hydrogen, hydroxyl, and

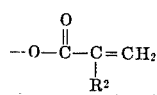

$m$ is an integer equal to at least 1, e.g., from 1 to about 15 or higher, and preferably from 1 to about 8 inclusive; $n$ is an integer equal to at least 1, e.g., 1 to about 20 or more; and $p$ is one of the following: 0, 1.

The polymerizable polyacrylate esters utilized in accordance with the invention and corresponding to the above general formula are exemplified by but not restricted to the following materials; di-, tri and tetraethylene glycol dimethacrylate, dipropylene glycol dimethacrylate, polyethylene glycol dimethacrylate, di(pentamethylene glycol) dimethacrylate, tetraethylene glycol diacrylate, tetraethylene glycol di(chlororacrylate), diglycerol diacrylate, diglycerol tetramethacrylate, tetramethylene dimethacrylate, ethylene dimethacrylate, neopentyl glycol diacrylate and trimethylol propane triacrylate. The foregoing monomers need not be in the pure state, but may comprise commercial grades in which stabilizers such as hydroquinones and quinones are included. As used herein the term "polymerizable polyacrylate ester monomer" includes not only the foregoing monomers in the pure and impure state, but also those other compositions which contain those monomers in amounts sufficient to impart to the compositions the polymerization characteristics of polyacrylate esters. It is also within the scope of the present invention to obtain modified characteristics for the cured composition by the utilization of one or more monomers within the above formula with other unsaturated monomers, such as unsaturated hydrocarbons or unsaturated esters.

A second class of preferred acrylate esters are those which are formed by the reaction of: a) an acrylate ester containing an active hydrogen atom in the nonacrylate portion of the ester; with (b) an organic polyisocyanate. Preferably, the active hydrogen is the hydrogen of a hydroxy or a primary or secondary amine substituent on the nonacrylate portion of the ester, and the polyisocyanate is a diisocyante. Naturally, an excess of the acrylate ester must be used to insure that each isocyanate functional group in the polyisocyanate is substituted.

The most preferred of the acrylate esters used in the manner described above are those in which the acrylate ester is an alkyl or aryl acrylate ester, most preferably having the formula

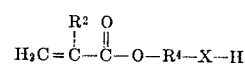

wherein X is selected from the group consisting of —O— and $R^5$
|
—N—; R5 is selected from the group consisting of hydrogen and alkyl or aralkyl of one through about 10 carbon atoms; $R^2$ is as defined above; and $R^4$ is a divalent organic radical selected from the group consisting of alkylene of one through about 10 carbon atoms, ether linked polyalkylene of one through about 12 carbon atoms, and divalent aromatic radicals containing up to about 14 carbon atoms, preferably phenylene, biphenylene and naphthalene.

Typical polyisocyanates which can be reacted with the above acrylate esters to form polyacrylate monomers are toluene diisocyanate, 4,4'-diphenyl diisocyanate, dianisidine diisocyanate, 1,5-naphthalene diisocyanate, trimethylene diisocyante, cyclohexylene diisocyanate, 2-chloropropane diisocyanate, 4,4'-diphenylmethane diisocyanate, 2,2'-diethyl-ether diisocyanate, 3(dimethylamino) pentane diisocyanate, tetrachlorophenylene diisocyanate-1,4, and trans-vinylene diisocyanate. Still other polyisocyanates that may be used are the higher molecular weight polyisocyanates obtained by reacting an excess of any of the above-described isocyanates with polyamines containing terminal, primary and secondary amine groups, or polyhydric alcohols, for example, the alkane and alkene polyols such as glycerol, 1,2,6-hexanetriol, 1,5-pentanediol, ethylene glycol, polyethylene glycol, bisphenol-A (4,4'-dihydroxydiphenyldimethylmethane), condensation products of alkylene oxides with bisphenol-A, and the like.

Other acceptable monomers which can be used in the adhesives disclosed herein are acrylate terminated epoxy or esters units, or low polymers thereof. Typical exemplary structures which have been prepared embodying these concepts are the following:

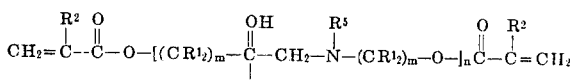

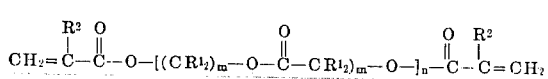

wherein $R^1$, $R^2$, $R^5$, $m$ and $n$ are as defined above.

Naturally any of the above-described acrylate and polyacrylate ester monomers can be used in combination if desired. Many of the higher molecular weight acrylate esters described above are extremely viscous and advantageously are mixed (diluted) with a low viscosity acrylate ester, such as an alkyl acrylate ester.

The most highly preferred of the peroxy initiators for use in combination with the polymerizable acrylate or polyacrylate esters described above are the organic hydroperoxy initiators, particularly those organic hydroperoxides having the formula $R^6OOH$, wherein $R^6$ is a hydrocarbon radical containing up to about 18 carbon atoms, preferably an alkyl, aryl, or aralkyl radical containing from one to about 12 carbon atoms. Typical examples of such hydroperoxides are cumene hydroperoxide, methylethylketonehydroperoxide, and hydroperoxides formed by the oxygenation of various hydrocarbons, such as methylbutene, cetane and cyclohexene. However, other peroxy initiators can be used, such as hydrogen peroxide, organic peroxides or organic peresters. Those peroxides and peresters which hydrolyze or decompose to form hydroperoxides frequently are highly useful.

The peroxy initiators which are used commonly comprise less than about 20 percent by weight of the combination of monomer and initiator since above that level they begin to effect adversely the strength of the adhesive bonds which are formed. Preferably the peroxy initiator comprises from about 0.5 to about 10 percent by weight of the combination.

Other materials can be added to the mixture of polymerizable acrylate ester monomer and peroxy initiator, such as quinone or hydroquinone stabilizers, tertiary amine or imide accelerators, and other functional materials, such as thickeners, coloring agents, etc. These additives are used to obtain commercially desired characteristics, i.e., suitable viscosity and shelf stability for extended periods (e.g., a minimum of 6 months). The presence of these additives is particularly important when peroxy initiators other than organic hydroperoxides are used. For a complete discussion of the anaerobic systems and anaerobically curing compositions, reference is made to the following U.S. Pat. Nos. 2,895,950 to Vernon K. Krieble, issued July 21, 1959; 3,041,322 to Vernon K. Krieble, issued June 26, 1962; 3,043,820 to Robert H. Krieble, issued July 10, 1962; 3,046,262 to Vernon K. Krieble, issued July 24, 1962; 3,203,941 to Vernon K. Krieble, issued Aug. 31, 1965; 3,218,305 to Vernon K. Krieble, issued Nov. 16, 1965; and 3,300,547 to J. W. Gorman et al. issued Jan. 24, 1967.

The following examples are given to demonstrate the use of the products and processes of the invention disclosed herein; they are not intended to be limitations upon the invention. Unless stated to the contrary, all ratios and percentages in the examples are on a weight basis.

EXAMPLES

Adhesives

In the evaluation of the bonding accelerators in the following examples, two commercially available anaerobic acrylate-type adhesive materials were used. Hereinafter, they will be referred to as Adhesive A (recommended for general adhesive use) and Adhesive B (recommended for use on threaded or other closely fitting metal parts). The approximate compositions of these two adhesives were as follows:

Adhesive A

| Component | Weight (%) |
|---|---|
| Adhesive Monomer 1[a] | 53.0 |
| Adhesive Monomer 2[b] | 13.5 |
| Isobutylmethacrylate | 23.0 |
| Cumene Hydroperoxide | 3.0 |
| Acrylic Acid | 6.0 |
| Minor Ingredients (stabilizer, latent accelerator, adhesive agent) | 1.5 |
| | 100.0 |

[a] Formed by reacting 2 moles of hydroxyethyl methacrylate with 1 mole of the reaction product of 1 mole hydrogenated Bisphenol-A (4,4'-dicyclohexanol-dimethylmethane) and 2 moles of toluene diisocyanate.

[b] Formed by reacting 3 moles of hydroxyethyl methacrylate with 1 mole of the reaction product of 1 mole of polypropylenetriol (avg. mol. wt. = 2,500) and 3 moles of toluene diisocyanate.

Adhesive B

| Component | Weight (%) |
|---|---|
| Polyethyleneglycoldimethacrylate (Avg. Mol. wt. = 330) | 82.0 |
| Plasticizer (tetraethyleneglycol di-2-ethylhexoate) | 14.0 |
| Cumene hydroperoxide | 2.5 |
| Minors (stabilizer, latent accelerator, dye) | 1.5 |
| | 100.0 |

TEST PROCEDURES

For each evaluation a stock solution of bonding accelerator was prepared by mixing 2 grams of the bonding accelerator with 98 grams of acetone. The stock solution was then used with Adhesive A and Adhesive B in the following tests.

Test 1. Using a cotton swab, a thin coating of the bonding accelerator solution was applied to the bottom 1 inch of a series of standard 1 inch by 5 inches by 1/16 inch thick steel lap strips. After allowing the acetone to evaporate, a thin coating of Adhesive A was applied over the areas where the bonding accelerator had been applied. An untreated lap strip then was placed in aligned contact with the treated portion of each of the treated lap strips, leaving a 1 inch overlap. The bonded portion of the lap strip assemblies were placed in pinch-clamps to reduce the bond line to approximately 0.003 inch.

After 10 minutes, one of the bonded lap strip assemblies was placed in a standard laboratory tensile tester (Research Products Co., Model RPC), and the force (lb./sq. in.) required to break the bond was measured. This procedure was repeated with a second strip assembly after 20 minutes, and again with a third assembly after 60 minutes. For comparison purposes, control samples were run under identical circumstances (i.e., applying only pure acetone to lap strips prior to applying Adhesive A).

Test 2. A thin film of the bonding accelerator solutions of test 1 were applied to the threaded surfaces of a series of standard ⅜-inch bolts. After the acetone evaporated, a few drops of Adhesive B were placed near the bottom of the threaded end of the bolt. A mating nut was assembled onto the adhesive treated bolt, leaving approximately three threads exposed below the nut.

After 10 minutes, the torque required to remove the nut from one of the bolts was determined. Both the "break-loose" and "prevailing" torques were measured. "Break-loose torque" is the amount of torque required to produce the first relative movement between the nut and bolt. "Prevailing torque" is the torque required to produce continuing relative movement between the nut and bolt, specifically the average torque required to produce one full revolution of the nut. Comparable measurements were made at 20 and 60 minutes. As in test 1, a series of controls were run using acetone instead of a bonding accelerator solution.

EXAMPLE I

A series of bonding accelerators were used in the test described above as test 1. The results are tabulated below in table I. In reporting the results of test 1, the word "fixtured" is used to define a relatively low degree of adhesion wherein lap strips, when held vertically by one end, will not separate and, when shaken gently, will not move relative to one another. When "fixtured," there is insufficient bond strength to permit an accurate tensile test determination (typically about 100 p.s.i. or less). The results are the average of two samples.

TABLE I

| Sample | Bonding accelerator | Lap strip tensile strength (p.s.i.) for— | | |
|---|---|---|---|---|
| | | 10 min. | 20 min. | 60 min. |
| Control | None | 0 | 0 | 0 |
| 1 | N,N'-dicyclohexyl thiourea | 500 | 610 | 480 |
| 2 | Copper dimethyldithio-carbamate | 0 | Fixtured | 400 |
| 3 | N-cyclohexylbenzothiazole-2-sulfonamide | 0 | 0 | 520 |
| 4 | Thiocarbanilide | 2,000 | 1,500 | 2,000 |
| 5 | Mercaptobenzothiazole | 2,300 | 2,400 | 2,700 |
| 6 | Thiourea | 1,000 | 1,500 | 1,300 |
| 7 | 1-allyl-2-thiourea | 2,100 | 2,400 | 2,400 |
| 8 | 2-thiazoline-2-thiol | 180 | 140 | 700 |
| 9 | Thioacetamide | 0 | Fixtured | 220 |
| 10 | 2-triazole-3-thiol | 300 | 760 | 1,300 |
| 11 | 5-amino-2-benzimide-azolethiol | 0 | 0 | 180 |

EXAMPLE II

The series of bonding accelerator used in example I, above, were used in the test described above as test 2. The results are tabulated below in table II. In reporting the results of test 2, the torques are reported to the nearest foot-pound. When significantly less than 1 foot-pound, they are reported as "LTFT" (less than finger tight), which indicates the nut can be turned without the aid of a torque wrench, or "MTFT" (more than finger tight) which indicates the nut cannot be turned without the aid of a torque wrench. In table II, the sample numbers refer to the bonding accelerators designated by the sample number in table 1, above. The results are the average of three samples.

TABLE II

| Sample | Breakaway torque (ft.-lbs.) for— | | | Prevailing torque (ft.-lbs.) for— | | |
|---|---|---|---|---|---|---|
| | 10 min. | 20 min. | 60 min. | 10 min. | 20 min. | 60 min. |
| Control | 0 | LTFT | MTFT | 0 | LTFT | MTFT |
| 1 | MTFT | 1 | 4 | MTFT | 3 | 10 |
| 2 | LTFT | LTFT | 2 | LTFT | LTFT | 8 |
| 3 | MTFT | MTFT | 2 | MTFT | MTFT | 6 |
| 4 | LTFT | LTFT | 1 | LTFT | LTFT | 3 |
| 5 | 1 | 3 | 2 | 5 | 8 | 4 |
| 6 | 2 | 4 | 3 | 3 | 7 | 5 |
| 7 | 2 | 3 | 5 | 5 | 9 | 8 |
| 8 | 2 | 2 | 3 | 8 | 7 | 9 |
| 9 | 2 | 2 | 2 | 4 | 5 | 6 |
| 10 | LTFT | LTFT | 2 | LTFT | LTFT | 2 |
| 11 | LTFT | LTFT | 1 | LTFT | LTFT | 2 |

We claim:

1. A two-part adhesive system which comprises: (a) as a first part, a polymerizable composition consisting essentially of a polymerizable polyacrylate ester monomer and an organic hydroperoxide polymerization initiator therefor; and (b) as a second part, an effective amount for accelerated cure of said first part of an organic bonding accelerator having the formula

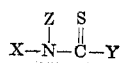

or

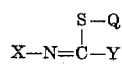

wherein each of X and Z is selected from the group consisting of H and R, where R is a hydrocarbon radical containing up to 10 carbon atoms, Y is selected from the group consisting of X, —SX, —NXZ and —N=R, and Q is selected from the group consisting of H, R, —SX and

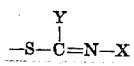

2. The adhesive system of claim 1, wherein the nitrogen and carbon atoms of the

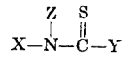

and

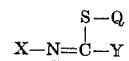

groups of the organic bonding accelerator are part of the heterocyclic rings of the form

and

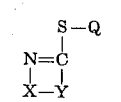

3. The adhesive system of claim 2, wherein the heterocyclic ring is a polynuclear heterocyclic ring system.

4. The adhesive system of claim 1 wherein the organic bonding accelerator is dissolved or dispersed in a volatile organic solvent.

5. The adhesive system of claim 1 wherein the organic bonding accelerator is mercaptobenzothiazole.

6. The adhesive system of claim 1 wherein the monomer is of the form:

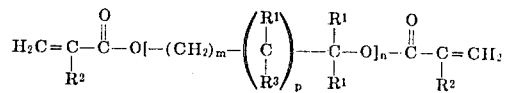

wherein $R^1$ represents a radical selected from the group consisting of hydrogen, lower alkyl of from one to about four carbon atoms, hydroxy alkyl of from one to about four carbon atoms, and

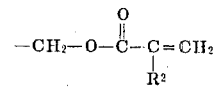

$R^2$ is a radical selected from the group consisting of hydrogen, halogen, and lower alkyl of from one to about four carbon atoms; $R^3$ is a radical selected from the group consisting of hydrogen, hydroxyl, and

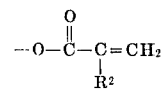

$m$ is an integer equal to at least 1; $n$ is an integer equal to at least 1; and $p$ is one of the following: 0, 1.

7. The adhesive system of claim 6 wherein $m$ is an integer between 1 and about 8, and $n$ is an integer between 1 and about 20.

8. The adhesive system of claim 6 wherein the monomer is a polyethylene glycol dimethacrylate.

9. The adhesive system of claim 8 wherein the organic bonding accelerator is mercaptobenzothiazole.

10. The adhesive system of claim 6 wherein the organic hydroperoxide is of the form $R^4OOH$, wherein $R^4$ is a hydrocarbon group containing up to about 18 carbon atoms.

11. The adhesive system of claim 10 wherein the organic hydroperoxide is cumene hydroperoxide.

12. An adhesive composition comprising: as a polymerizable composition, a mixture consisting essentially of (a) a polymerizable polyacrylate ester monomer and (b) a hydroperoxide polymerization initiator therefor; and as a bonding accelerator, (c) an effective amount for accelerated cure of said polymerizable composition of an organic compound having the formula

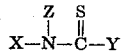

or

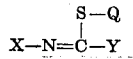

wherein each of X and Z is H or R, where R is a hydrocarbon group containing up to about 10 carbon atoms, Y is selected from the group consisting of H, R, —SX, —NXZ and —N=R, and Q is selected from the group consisting of H, R, —SX and

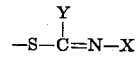

13. The adhesive composition of claim 12 wherein the bonding accelerator comprises from about 0.1 percent to about 5.0 percent by weight of the curing composition.

* * * * *